United States Patent [19]

Thaller

[11] 4,159,366
[45] Jun. 26, 1979

[54] ELECTROCHEMICAL CELL FOR REBALANCING REDOX FLOW SYSTEM

[75] Inventor: Lawrence H. Thaller, Strongsville, Ohio

[73] Assignee: The United States of America as represented by the Administrator of the National Aeronautics and Space Administration, Washington, D.C.

[21] Appl. No.: 914,260

[22] Filed: Jun. 9, 1978

[51] Int. Cl.² .............................................. H01M 8/04
[52] U.S. Cl. ...................................... 429/15; 429/101
[58] Field of Search ...................... 429/15, 14, 17, 19, 429/21, 27, 29, 46, 101, 107, 109

[56] References Cited

U.S. PATENT DOCUMENTS

| | | | |
|---|---|---|---|
| 3,255,046 | 6/1966 | Ghormley | 429/107 X |
| 3,540,934 | 11/1970 | Boeke | 429/101 X |
| 3,551,207 | 12/1970 | Herbst | 429/14 |
| 3,920,474 | 11/1975 | Zito, Jr. et al. | 429/15 |
| 3,996,064 | 12/1976 | Thaller | 429/21 X |

Primary Examiner—Charles F. LeFevour
Attorney, Agent, or Firm—Normal T. Musial; John R. Manning; James A. Mackin

[57] ABSTRACT

There is disclosed an electrically rechargeable REDOX cell or battery system including one or more rebalancing cells. Each rebalancing cell is divided into two chambers by an ion permeable membrane. The first chamber is fed with gaseous hydrogen and a cathode fluid which is circulated through the cathode chamber of the REDOX cell is also passed through the second chamber of the rebalancing cell. Electrochemical reactions take place on the surface of inert electrodes in the first and second chambers to rebalance the electrochemical capacity of the anode and cathode fluids of the REDOX system.

15 Claims, 1 Drawing Figure

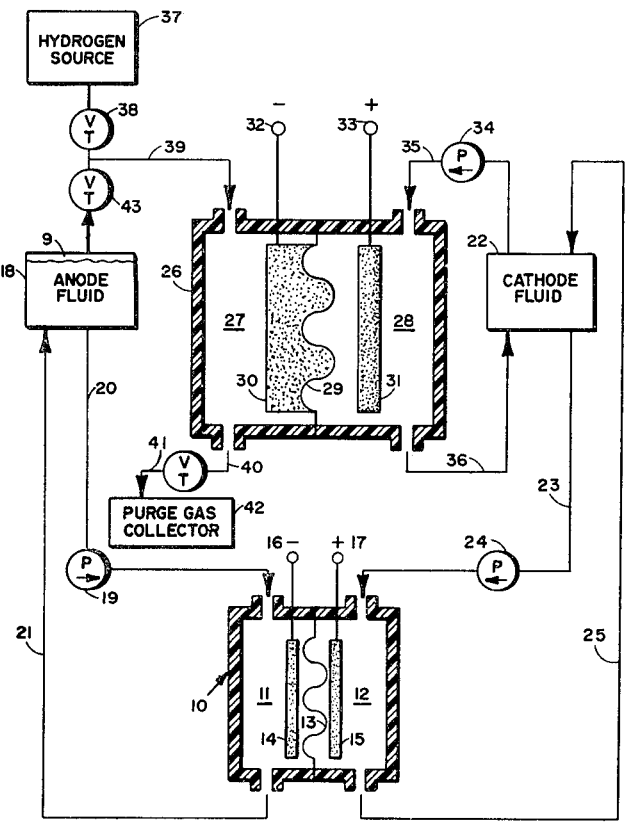

ELECTROCHEMICAL CELL FOR REBALANCING REDOX FLOW SYSTEM

ORIGIN OF THE INVENTION

This invention was made by an employee of the Government of the United States of America and may be manufactured or used by or for the Government without the payment of any royalties thereon or therefore.

BACKGROUND OF THE INVENTION

1. Field of the Invention

This invention relates to electrical energy storage devices and is directed more particularly to an electrically rechargeable, reduction-oxidation (REDOX) type cell.

2. Description of the Prior Art

REDOX cells utilizing anode and cathode fluids separated by an ion permeable membrane and employing REDOX couples as the electrochemical active materials are generally well known. The electrochemical capacity of these fluids is a function of the amount of active material in the solution and the oxidation state of the material. If the anode fluid and the cathode fluid contain the same number of equivalents of active material and both have the same degree of charge the REDOX system is said to be in balance.

For a REDOX system using a chromous/chromic couple as the anode fluid and the ferrous/ferric couple as the cathode fluid, a balanced system has the same number of equivalents of chromous chloride in the anode fluid as there are equivalents of ferric chloride in the cathode fluid. The anode fluid is an aqueous solution of hydrochloric acid and chromium chloride while the cathode fluid is an aqueous solution of hydrochloric acid and iron chloride.

During the operation of a REDOX system, electrochemical imbalance can gradually build up if reactions other than the desired electrochemical REDOX reactions occur. For example, if a system when new had a capacity of 100 ampere hours and after a certain length of time had a capacity of only 90 ampere hours, it would be clear that an imbalance between the anode and cathode fluids had occurred. This imbalance is defined as a different state of charge in the anode and cathode fluids.

An imbalance in a REDOX system can occur for a number of reasons including, but not limited to, the following:

1. AIR INTRUSION INTO THE CATHODE FLUID

If air leaks into the cathode fluid, oxygen in the air will chemically oxidize some of the ferrous ions to ferric ions. If this effect is allowed to continue over a long period of time, a significant amount of balance between the anode and cathode fluids will occur. The equation which describes the chemical oxidation of ferrous ions is as follows:

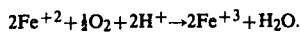
$2Fe^{+2} + \frac{1}{2}O_2 + 2H^+ \rightarrow 2Fe^{+3} + H_2O$.

The net consequence of the effects of this reaction is that the iron solution (cathode fluid) will become fully charged prior to the chromium solution (anode fluid). The chromium solution becomes charged electrochemically to the same extent as the iron solution is charged electrochemically.

2. AIR OXIDATION OF THE ANODE FLUID

If there is air intrusion into the chromium solution, the oxygen will chemically oxidize some of the chromous ions to chromic ions. This is equivalent to discharging the anode fluid while the cathode fluid is not being discharged. The chemical reaction is written as follows:

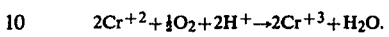
$2Cr^{+2} + \frac{1}{2}O_2 + 2H^+ \rightarrow 2Cr^{+3} + H_2O$.

It is only during electrochemical discharge or charge that the chromium solution and the iron solution undergo a commensurate degree of oxidation or reduction.

3. THE CO-EVOLUTION OF H₂ DURING RECHARGE.

During the recharge of the anode fluid there are two possible electrochemical reactions that can take place. The electrochemical reduction of chromic ions to chromous ion is the predominant or major reaction as follows:

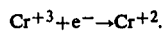
$Cr^{+3} + e^- \rightarrow Cr^{+2}$.

The electrochemical reduction of hydrogen ions is possible also but to a much lesser degree than chromium ion reduction as shown by the equation:

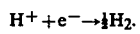
$H^+ + e^- \rightarrow \frac{1}{2}H_2$.

4. CHEMICAL REDUCTION OF WATER BY CHROMOUS ION

Chromous ion ($Cr^{+2}$) is a strong reducing agent and can reduce the hydrogen ions contained in the anode fluid to hydrogen gas according to the equation:

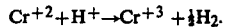
$Cr^{+2} + H^+ \rightarrow Cr^{+3} + \frac{1}{2}H_2$.

As in situation 3. there is a reduction in the amount of chromous ions without a commensurate reduction in the amount of ferric ions in the cathode fluid. The system imbalance in these instances would reveal themselves as an early depletion of the chromous ions.

All of the foregoing side reactions are minor but as their effects accumulate over the course of time, the capacity of the system as a whole will be reduced and limited by the capacity of the limiting reactant.

A discussion of the electrode considerations and membrane considerations for REDOX cells is given in U.S. Pat. No. 3,996,064 which is incorporated herein by reference.

OBJECTS AND SUMMARY OF THE INVENTION

It is an object of the invention to provide an improved REDOX cell system of high efficiency.

It is another object of the invention to provide a REDOX cell system wherein an imbalance between the anode and cathode fluids is substantially prevented.

Yet another object is to provide a REDOX cell system wherein gas produced by an undesirable side reaction is utilized to rebalance the system.

Still another object of the invention is to provide a REDOX cell system having a rebalancing cell or an assembly of cells which provide electrical power output while constantly balancing and equalizing the charge of the anode and cathode fluids.

In summary, the invention provides a REDOX cell system (one or more cells) including one or more rebalancing cells which maintain an equal electrical charge in the anode and cathode fluids while at the same time supplying electrical power output.

BRIEF DESCRIPTION OF THE DRAWINGS

The single FIGURE is a schematic drawing of a REDOX cell system embodying the invention.

DESCRIPTION OF A PREFERRED EMBODIMENT

Figure 1:
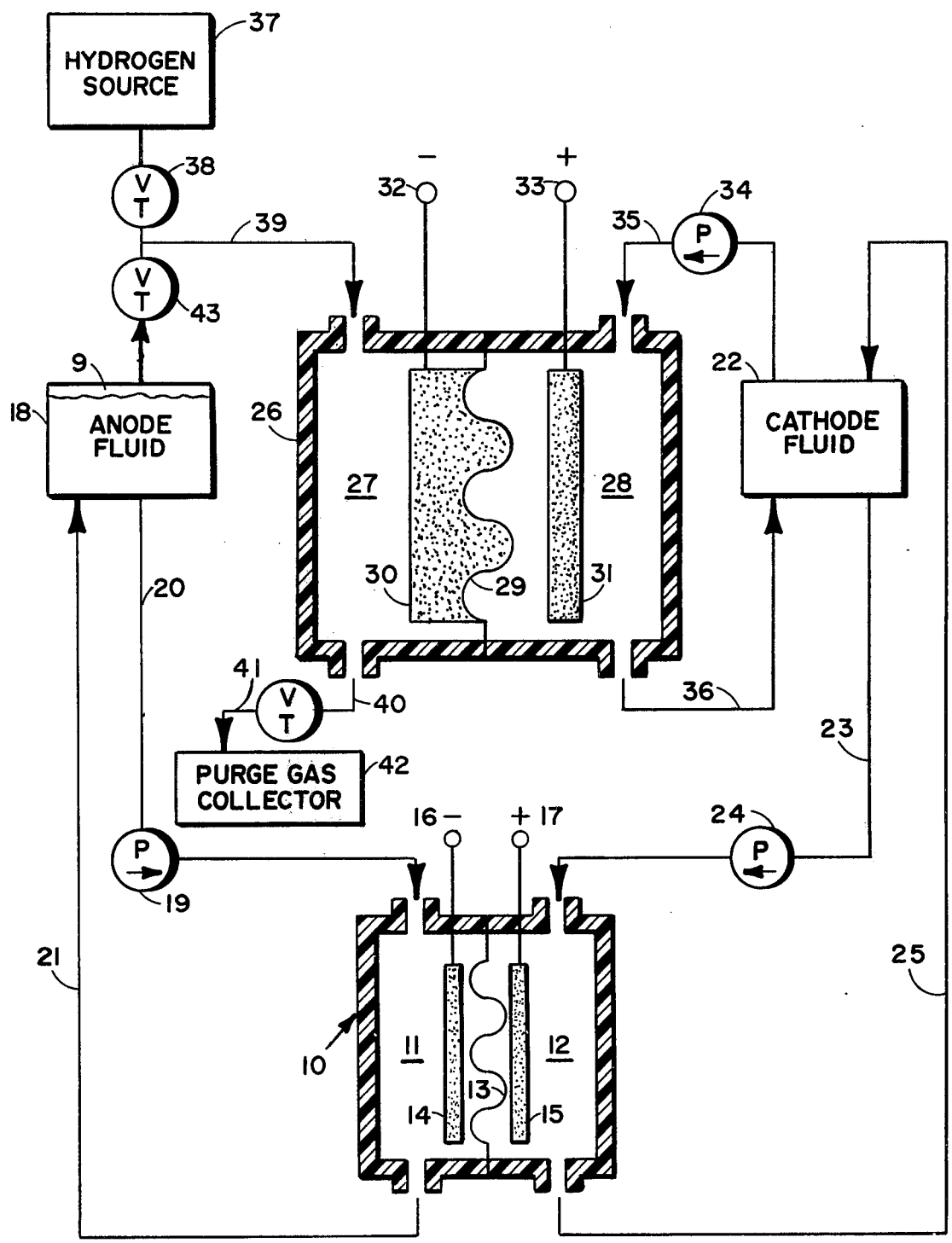

Referring now to the single FIGURE, there is shown a REDOX cell 10 divided into compartments 11 and 12 by an ion conductive membrane 13. Electrodes 14 and 15 of inert materials such as carbon, graphite, or the like are disposed in chambers 11 and 12, respectively, and are connected to electrical output terminals 16 and 17, respectively, to provide electrical potential thereon.

The ion conductive membrane 13 is preferably an anion exchange membrane when the REDOX cell 10 is of the iron/chromium type. However, a cation exchange membrane may be more suitable where different couples are used. A detailed discussion of membrane considerations for REDOX cells is set forth in U.S. Pat. No. 3,996,064.

The REDOX cell 10 is preferably of the iron/chromium type and will, therefore, have a chromous/chromic couple in chamber 11 and a ferric/ferrous couple in chamber 12. Accordingly, there is provided an anode fluid source 18 containing an aqueous solution of HCl having dissolved therein chromium chloride. A pump 19 causes the anode fluid to flow through a circuit 20, through the chamber 11 and back to the anode fluid source 18 via a conduit 21.

Cathode fluid having a ferric/ferrous couple for chamber 12 is provided from a cathode fluid source 22. The cathode fluid is an aqueous solution of HCl having dissolved therein iron chloride. The cathode fluid flows through a conduit 23, a pump 24, the chamber 12 and a return conduit 25.

The description thus far describes a conventional iron/chromium REDOX cell. As discussed previously, electrochemical imbalance can occur and will gradually increase thereby reducing the ampere hour capacity of the REDOX cell.

To the end that imbalance of an iron/chromium REDOX cell will be substantially eliminated, there is provided in accordance with the invention a rebalancing cell 26 divided into chambers 27 and 28 by an ion exchange membrane or other suitable membrane material 29. Inert electrodes 30 and 31 are disposed in compartments 27 and 28, respectively, and are also connected to electrical terminals 32 and 33, respectively. As shown, electrode 30 is preferably in direct contact with the membrane 29 since it is a gaseous electrode. Cathode fluid from the cathode fluid source 22, which is the same cathode fluid provided to the chamber 12 of REDOX cell 10, is directed by a pump 34 through a conduit 35, the chamber 28 and then back to the cathode fluid chamber through a conduit 36.

By a desirable electrochemical process in the rebalancing cell 26, the cathode fluid is modified in a desired manner. Hydrogen gas is consumed in the anode chamber and ferric ions are reduced to ferrous ions. Hydrogen gas is supplied to chamber 27 from fluid source 18 through valve 43 and is due to the side reactions of situations 3 or 4 above. Hydrogen gas can also be supplied by an independent hydrogen source 37 through a suitable throttle valve 38 and conduit 39. The hydrogen flows into chamber 27 where it is consumed electrochemically. The impurities that build up in the hydrogen may be released via conduit 40 and valve 41 into the atmosphere but are preferably directed into a purge gas collector 42.

The hydrogen gas supplied to chamber 27 from anode fluid source 18 is obtained from a hydrogen space 9 above the anode fluid. It is produced by the reduction of hydrogen ions during recharge of the REDOX cell and/or by chemical reduction of water by chromous ions.

In chamber 27 of rebalancing cell 26, the hydrogen gas is electrochemically oxidized to form hydrogen ions which are transported through the membrane 29 to the cathode fluid. Ferric ions from the cathode fluid are electrochemically reduced to ferrous ions in the cathode chamber 28. While these rebalancing operations are occurring, electrical power can be drawn from terminals 32 and 33 of the rebalancing cell.

The valves 38 and 43 together with valve 41 may be adjusted to control hydrogen flow and pressure in anode chamber 27. Hydrogen from source 37 or from the hydrogen space 9 may be supplied severally or concurrently to chamber 27 by adjustment of valves 38 and 43.

In accordance with the rebalancing action of the rebalancing cell 26 wherein there is a transfer of ions between the cathode fluid of chamber 28 and the hydrogen in chamber 27, a difference of electrical potential will be produced between the inert electrodes 30 and 31. Advantageously, this difference of potential will provide energy for a suitable electrical load device connected to terminals 32 and 33 which, in turn, are connected to the electrodes 30 and 31, respectively.

The terminals 32 and 33, however, can be connected together although the system will then have a somewhat lower efficiency. It will be understood that one or more REDOX and/or rebalancing cells may be connected electrically in series or parallel. Also, the anode and cathode fluids may be directed in series or parallel through the cell chambers.

As discussed previously, imbalance in a REDOX cell system occurs because of:
1. Air intrusion into the cathode fluid;
2. Air oxidation of the anode fluids;
3. Co-evolution of hydrogen during recharge;
4. Chemical reduction of water by chromous ions.

Operation of the REDOX system incorporating the invention will now be explained.

The electrochemical reactions that take place within the rebalance cell 26 or stack or rebalance cells are as follows: At the anode 30, hydrogen gas is oxidized to hydrogen ions, according to the equation:

$$\tfrac{1}{2}H_2 \rightarrow H^+ + e^-.$$

Simultaneously, at the cathode 31 ferric ions are reduced to ferrous ions according to the equation:

$$Fe^{+3} + e^- \rightarrow Fe^{+2}$$

the overall equation is:

$$\tfrac{1}{2}H_2 + Fe^{+3} \rightarrow Fe^{+2} + H^+.$$

If situations 1 and 2 are now examined in light of this, it can be seen that the imbalance situation can be overcome.

If an external supply of hydrogen gas 9 and/or 37 is connected to the rebalance cell 26 or stack of rebalance cells, then as the rebalance cell is discharged, hydrogen is consumed as well as ferric ion. With the reduction in ferric ion content in the actual REDOX system, electrochemical recharging can proceed and the remainder of the chromic ion that had hitherto remained uncharged can now be recharged and the system brought back into balance. This covers situation 1. where air intrusion in the hydrogen side necessitated the rebalance procedure.

In situation 2 where air intrusion in the chromium side necessitated the rebalancing procedure, there is an excess of ferric ions present upon recharge and, thus, the same rebalance procedure can be used. For situations 3 and 4 where hydrogen gas is generated in the anode fluid, this hydrogen can be conducted to the rebalance cell and there consumed as the cathode fluid is rebalanced.

Advantageously, as these rebalance reactions are taking place, energy is available from these rebalancing cells at terminals 32 and 33. The voltage one can expect from such a device is that of an iron/hydrogen cell. (0.77 volts per cell).

It is to be noted that the sum of the side reactions that result from situation 1.

$$2Fe^{+2} + \tfrac{1}{2}O_2 + 2H^+ \rightarrow 2Fe^{+3} + H_2O$$

and the rebalance reaction that is used to correct this situation:

$$2Fe^{+3} + H_2 \rightarrow 2Fe^{+2} + 2H^+$$

is:

$$\tfrac{1}{2}O_2 + H_2 \rightarrow H_2O.$$

There will be a gradual buildup in the water content of the system. This, of course, should be negligible in the overall sense. Likewise, situation 2. when rebalanced results in gradual water buildup. Situations 3. and 4., on the other hand, do not result in any water buildups.

It will be understood that changes and modifications to the above-described REDOX system may be made without departing from the spirit and scope of the invention, as set forth in the claims appended hereto.

What is claimed is:

1. In a REDOX cell system utilizing an anode fluid and a cathode fluid wherein hydrogen ions and chloride ions are exchanged through a first ion exchange membrane separating the fluids, the improvement comprising:
   a rebalancing cell having an anode compartment and a cathode compartment separated by a second ion exchange membrane;
   an inert electrode disposed in each of said anode and cathode compartments of said rebalancing cell and connected to respective electrical terminals to provide electrical output to a load connected therebetween;
   means for directing a portion of said cathode fluid of said REDOX cell through said cathode compartment of said rebalancing cell;
   a supply of hydrogen gas; and
   means for directing hydrogen gas from said supply of hydrogen gas to said anode compartment of said rebalancing cell to rebalance the charge of said anode and cathode fluids of said REDOX cell.

2. The REDOX cell system of claim 1 wherein the inert electrode in the first compartment of the rebalancing cell is in direct contact with the ion exchange membrane.

3. The REDOX cell system of claim 1 and including means for removing nonreacted gas from the first compartment of the rebalancing cell.

4. The REDOX cell system of claim 3 and including means for collecting said nonreacted gas.

5. The REDOX cell system of claim 1 wherein said anode fluid is an aqueous HCl solution having chromium chloride dissolved therein; and
   said cathode fluid is an aqueous HCl solution having iron chloride dissolved therein.

6. The REDOX cell system of claim 1 wherein said supply of hydrogen is an independent source.

7. The REDOX cell system of claim 1 wherein said supply of hydrogen gas is an anode fluid source.

8. The REDOX cell system of claim 7 and including an independent source of hydrogen communicating with the anode chamber of the rebalancing cell.

9. The REDOX cell system of claim 1 wherein said second ion exchange membrane passes only anions.

10. A method of balancing the charge in the anode and cathode fluids of a REDOX cell of the type wherein hydrogen and chloride ions are exchanged through a first ion exchange membrane separating the fluids comprising the steps of:
    providing a rebalancing cell with a second ion exchange membrane;
    passing said cathode fluid over one side of said second ion exchange membrane;
    disposing a first inert electrode adjacent said second ion exchange membrane in said cathode fluid;
    supplying hydrogen gas to the other side of said second ion exchange membrane;
    disposing a second inert electrode in contact with the other side of said second ion exchange membrane in said hydrogen gas; and
    electrically connecting an electrical device to be energized between said first and second inert electrodes;
    whereby ions are exchanged through said second ion exchange membrane to rebalance the charge of said REDOX cell fluids.

11. The method of claim 10 wherein said second inert electrode is attached to said other side of said ion exchange membrane.

12. The method of claim 10 wherein said anode fluid is an aqueous HCl solution having chromium chloride dissolved therein; and,
    said cathode fluid is an aqueous HCl solution having iron chloride dissolved therein.

13. The method of claim 10 and including the step of controlling the rate of hydrogen flow to said other side of the second membrane.

14. The method of claim 10 and including the step of controlling the pressure of hydrogen flowing to said other side of the second membrane.

15. The method of claim 10 wherein said second membrane is an anion exchange membrane.

* * * * *